United States Patent
Vigil

(10) Patent No.: US 8,549,049 B2
(45) Date of Patent: Oct. 1, 2013

(54) SYSTEMS AND METHODS FOR UPDATING AN APPLICATION ON A MOBILE INFORMATION DEVICE

(75) Inventor: Jeffrey S. Vigil, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1645 days.

(21) Appl. No.: 11/105,075

(22) Filed: Apr. 13, 2005

(65) Prior Publication Data

US 2006/0235890 A1    Oct. 19, 2006

(51) Int. Cl.
*G06F 17/30* (2006.01)

(52) U.S. Cl.
USPC .......................................... 707/822

(58) Field of Classification Search
USPC .......................................... 707/200
See application file for complete search history.

(56) References Cited

U.S. PATENT DOCUMENTS

| | | | |
|---|---|---|---|
| 5,974,454 A | 10/1999 | Apfel et al. | |
| 6,675,382 B1 | 1/2004 | Foster | |
| 6,735,434 B2 | 5/2004 | Criss et al. | |
| 2002/0131404 A1 | 9/2002 | Mehta et al. | |
| 2003/0056194 A1 | 3/2003 | Iglesias | |
| 2003/0066059 A1 | 4/2003 | Moon et al. | |
| 2003/0081002 A1 | 5/2003 | De Vorchik et al. | |
| 2003/0237050 A1 * | 12/2003 | Davidov et al. | 715/513 |
| 2004/0062130 A1 | 4/2004 | Chiang | |
| 2004/0073901 A1 | 4/2004 | Imamatsu | |
| 2004/0088694 A1 | 5/2004 | Ho | |
| 2004/0093593 A1 | 5/2004 | Jhanwar et al. | |
| 2005/0033987 A1 * | 2/2005 | Yan et al. | 713/201 |
| 2006/0080351 A1 * | 4/2006 | Powell et al. | 707/102 |
| 2006/0135129 A1 * | 6/2006 | Park | 455/412.1 |
| 2006/0233126 A1 * | 10/2006 | Herenyi et al. | 370/328 |
| 2006/0277535 A1 * | 12/2006 | Ketzer | 717/168 |

FOREIGN PATENT DOCUMENTS

| | | |
|---|---|---|
| JP | 2002-297390 | 10/2002 |
| JP | 2003-067209 | 3/2003 |
| JP | 2003-091420 | 3/2003 |
| JP | 2004-227520 | 8/2004 |
| WO | WO-2004/028182 | 4/2004 |
| WO | 2004/054275 | 6/2004 |

OTHER PUBLICATIONS

"Mobile Information Device Profile, Version 2.0", Nov. 5, 2002. Sun Microsystems, Inc. and Motorola, Inc., pp. 1-566.
Office Action issued for Japanese Patent Application No. JP 2006-110269 on Nov. 1, 2011.

* cited by examiner

*Primary Examiner* — John Breene
*Assistant Examiner* — Joshua Bullock
(74) *Attorney, Agent, or Firm* — Austin Rapp & Hardman

(57) ABSTRACT

An application manager receives a descriptor for a MIDlet update from an MIDP server system. The application manager determines that the descriptor identifies an update to a MIDlet that is already installed on the MID. The application manager also identifies the MIDlet for which the update is intended, and determines that the update is valid with respect to the MIDlet. The application manager provides information from the descriptor to the user of the MID. If the user decides to download the update that corresponds to the descriptor, the application manager sends a request to the MIDP server system to transmit the MIDlet update to the MID. When the application manager receives the MIDlet update from the MIDP server system, an installer installs the file(s) of the MIDlet update in the existing MIDlet.

19 Claims, 7 Drawing Sheets

SYSTEMS AND METHODS FOR UPDATING AN APPLICATION ON A MOBILE INFORMATION DEVICE

TECHNICAL FIELD

The present invention relates generally to computers and computer-related technology. More specifically, the present invention relates to systems and methods for updating an application on a mobile information device.

BACKGROUND

Computer technologies continue to advance at a rapid pace. Indeed, computers are used in almost all aspects of business, industry and academic endeavors. Improvements in computer technologies have been a force for bringing about great increases in business and industrial productivity. More and more homes are using computers as well.

There are many different kinds of computers in use today. The term "computer system" will be used herein to refer generally to any device or combination of devices that is capable of processing information to produce a desired result. Some examples of computer systems include personal computers, hand-held computers, personal digital assistants (PDAs), servers, mainframes, supercomputers, minicomputers, workstations, microcomputers, microcontrollers, and the like.

Java® is an object-oriented programming language designed to generate applications that can run on all hardware platforms without modification. Source code that is written in the Java® programming language is compiled into byte code. The byte code is then run on a Java® Virtual Machine (JVM), which is a program written in native code on the host hardware that translates Java® byte code into usable code on the hardware.

The Java® 2 Platform, Micro Edition (J2ME) is a technology that allows programmers to use the Java® programming language to develop applications for embedded devices, such as mobile phones, personal digital assistants (PDAs), pagers, etc. Such devices may be referred to as mobile information devices (MIDs).

The Mobile Information Device Profile (MIDP) defines an architecture and the associated application programming interfaces (APIs) for facilitating an application development environment for MIDs. An application that is written for the MIDP is referred to as a MIDlet. A MIDlet suite is a collection of Java® class files and content files (e.g., images) that may be used as part of a MIDlet. The files of a MIDlet suite may be enclosed within a Java® archive (JAR) file. A MIDlet suite may include a single MIDlet, or multiple MIDlets. As used herein, the term MIDlet may refer to either a standalone MIDlet or to a MIDlet that is part of a MIDlet suite.

In some situations, it may be desirable to update an existing MIDlet. Updating a MIDlet may involve providing additional functionality for the MIDlet, correcting errors that have been found in the MIDlet, etc. One way to update a MIDlet is to create a new version of the MIDlet that includes the desired update(s). The user obtains the updated MIDlet by downloading the new version of the MIDlet in its entirety. However, there may be some disadvantages with this kind of an approach. The updated MIDlet may include some of the same files as the previous version of the MIDlet. Thus, downloading the updated version of the MIDlet may be somewhat inefficient, because some files of the MIDlet may be downloaded multiple times. Accordingly, benefits may be realized by improved systems and methods for updating an existing MIDlet. Some exemplary systems and methods for updating an existing MIDlet are described herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
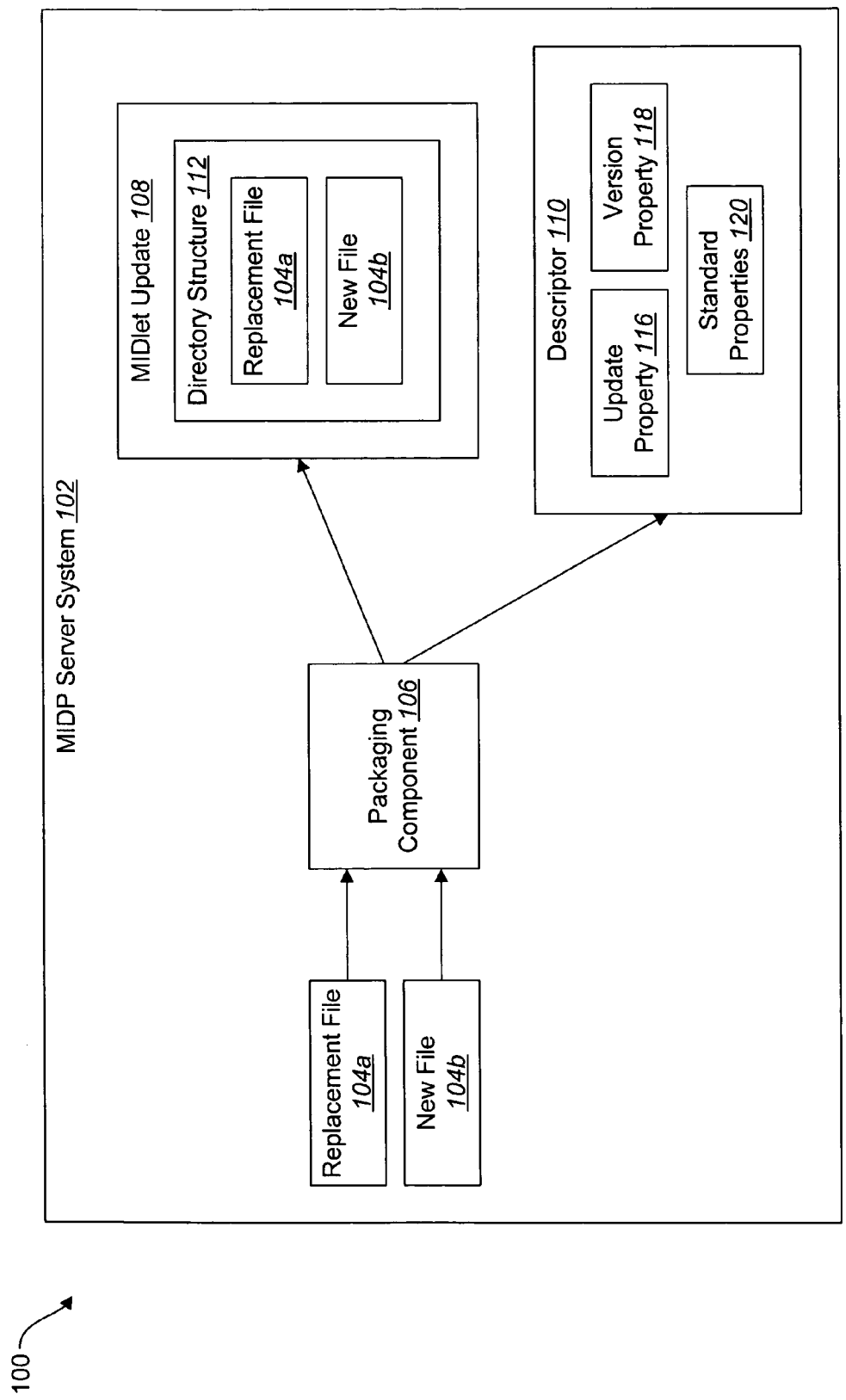
FIG. 1 illustrates various components in a server system that may be used to create a MIDlet update and an accompanying descriptor.

A method for providing an update to an existing MIDlet is disclosed. The method may be implemented in a server system that hosts one or more MIDlet suites and one or more MIDlet descriptors for download. One or more files are provided that update the existing MIDlet. The one or more files may include one or more replacement files, and/or one or more new files. The one or more files are packaged to create a MIDlet update. The MIDlet update does not comprise a complete replacement of the existing MIDlet. A descriptor is created for the MIDlet update. An update property is added to the descriptor. The update property identifies the MIDlet update as an update to the existing MIDlet. The descriptor is associated with the MIDlet update.

In some embodiments, a directory structure may be created for the MIDlet update that matches the existing MIDlet's directory structure. Each of the one or more files may be placed in a location within the directory structure that corresponds to a desired location within the existing MIDlet's directory structure.

A version property may be added to the descriptor. The version property may include a major field, a minor field, and a micro field.

The descriptor may be transmitted to a mobile information device. A request may be received from a mobile information device to transmit the MIDlet update to the mobile information device. In response to the request, the MIDlet update may be transmitted to the mobile information device.

A server system that is configured to implement a method for providing an update to an existing MIDlet is also disclosed. The server system includes a processor, and memory in electronic communication with the processor. Instructions are stored in the memory. The instructions are executable to implement the method described above for providing an update to an existing MIDlet. A computer-readable medium comprising executable instructions for implementing a method for providing an update to an existing MIDlet is also disclosed.

A method for obtaining an update to an existing MIDlet is also disclosed. The method may be implemented in a mobile information device. A user's request to download a MIDlet update may be received. The MIDlet update comprises one or more files that update the existing MIDlet. The MIDlet update does not comprise a complete replacement of the existing MIDlet. In response to the user's request, a request is sent to a server to transmit the MIDlet update to the mobile information device. The MIDlet update is received from the server. The one or more files of the MIDlet update are installed in the existing MIDlet.

In some embodiments, the MIDlet update may include a directory structure that matches the existing MIDlet's directory structure. Installing the one or more files of the MIDlet update in the existing MIDlet may involve unpacking the existing MIDlet into a directory. The MIDlet update may be subsequently unpacked into the directory. Files within the directory may be repackaged to create an updated version of the existing MIDlet.

The one or more files of the MIDlet update may include one or more replacement files and/or one or more new files. Installing the one or more files of the MIDlet update in the existing MIDlet may involve replacing a file in the existing MIDlet with a replacement file, and/or creating a new file in the existing MIDlet.

When a descriptor is received from the server, a determination may be made about whether the descriptor identifies an update. This may involve determining whether the descriptor includes an update property.

If it is determined that the descriptor identifies an update, a MIDlet for which the update is intended may be identified. This may involve searching for another descriptor on the mobile information device that includes one or more properties that match corresponding properties in the descriptor.

A determination may be made about whether the update is valid with respect to the MIDlet. This may involve determining that the update is valid comprises determining that a first version property in the descriptor refers to a later version of the MIDlet than a second version property in the MIDlet's descriptor. Information from the descriptor may be provided to a user.

A mobile information device that is configured to implement a method for obtaining an update to an existing MIDlet is also disclosed. The mobile information device includes a processor, and memory in electronic communication with the processor. Instructions are stored in the memory. The instructions are executable to implement the method described above for obtaining an update to an existing MIDlet. A computer-readable medium comprising executable instructions for implementing a method for obtaining an update to an existing MIDlet is also disclosed.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As indicated above, the Mobile Information Device Profile (MIDP) defines an architecture and the associated application programming interfaces (APIs) for facilitating an application development environment for mobile information devices (MIDs), such as mobile phones, personal digital assistants (PDAs), pagers, etc. An application that is written for the MIDP is referred to as a MIDlet. FIG. 1 illustrates components in an embodiment of a system 100 for updating a MIDlet. The system 100 includes a server system 102 that hosts one or more MIDlet suites and MIDlet descriptors for download.

An application developer may create one or more files 104 that update an existing MIDlet (not shown in FIG. 1). For example, the files 104 may provide additional functionality for the MIDlet, correct errors that have been found in the MIDlet, etc. The files 104 may include Java® class files, content files (e.g., images), etc.

In the illustrated embodiment, the files 104 include a replacement file 104a and a new file 104b. The replacement file 104a is a newer version of a file that already exists in the existing MIDlet. The new file 104b is a file that is new relative to the existing MIDlet. In other words, the existing MIDlet does not have a previous version of the file 104b already installed.

A packaging component 106 packages the files 104 to create a MIDlet update 108. In some embodiments, the packaging component 106 may be a Java® Archive Tool, and the files 104 may be packaged together in a Java® archive (JAR) file.

The packaging component 106 creates a directory structure for the MIDlet update 108 that matches the directory structure of the existing MIDlet. More specifically, a base directory is provided that matches the base directory of the existing MIDlet. In addition, sub-directories are created within the MIDlet update 108 that match the sub-directories within the existing MIDlet.

The files 104 are placed in a location within the directory structure 112 that corresponds to a desired location within the existing MIDlet's directory structure. For example, if a file 104 is supposed to be installed in the base directory of the existing MIDlet, then the file 104 is placed in the base directory of the MIDlet update 108. Similarly, if a file 104 is supposed to be installed in a particular sub-directory of the existing MIDlet, then the file 104 is placed in that sub-directory of the MIDlet update 108.

In accordance with the MIDP specification, a descriptor is created for each MIDlet (or MIDlet suite) that is made available for download by an MID. A descriptor is a file that is associated with, but separate from, a MIDlet. The descriptor for a MIDlet includes information about the MIDlet, such as the name of the MIDlet, the size of the MIDlet, etc.

In the illustrated embodiment, the packaging component 106 creates a descriptor 110 for the MIDlet update 108. The descriptor 110 is a file that is associated with, but separate from, the MIDlet update 108. The descriptor 110 includes information about the MIDlet update 108. More specifically, the descriptor 110 includes various properties, including an update property 116, a version property 118, and one or more standard properties 120. The update property 116 indicates that the descriptor 110 identifies an update to an existing MIDlet, as opposed to a new MIDlet. The update property 116 is not presently defined in the MIDP specification. The version property 118 identifies the version number of the existing MIDlet that will be created once the files 104 from the MIDlet update 108 are installed in the MIDlet. The standard properties 120 are properties that are presently defined in the MIDP specification. Some examples of standard properties 120 include a name property, a vendor property, a size property, a description property, etc.

Figure 2:
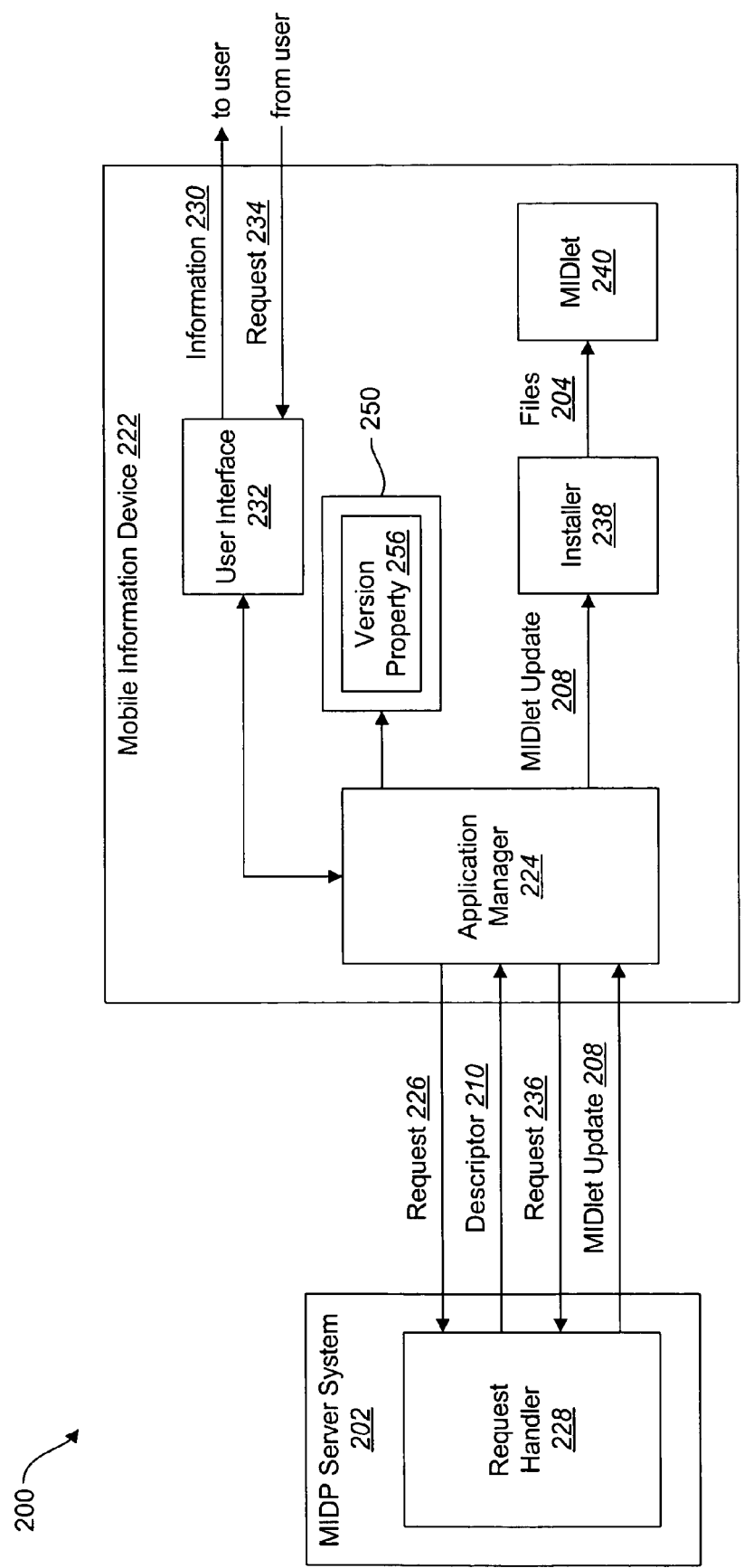
FIG. 2 illustrates various components that may be used when an MID discovers, downloads, and installs a MIDlet update from an MIDP server system.

Once a MIDlet update and an accompanying descriptor have been created, MIDs may be allowed to discover and download the descriptor and the MIDlet update from an MIDP server system. FIG. 2 illustrates various components that may be used to implement this functionality in some embodiments.

The system 200 shown in FIG. 2 includes a mobile information device (MID) 222 in electronic communication with an MIDP server system 202. The MID 222 includes an application manager 224. In some embodiments, the application manager 224 may be a Java® Application Manager (JAM). In the MIDP specification, the application manager 224 is sometimes referred to as Application Management Software (AMS).

The application manager 224 is configured to manage the downloading, installation, and lifecycle of MIDlets. In the illustrated embodiment, where an update 208 to an existing MIDlet 240 is available for download from an MIDP server system 202, the application manager 224 also manages the downloading and installation of the MIDlet update 208.

More specifically, at some point the application manager 224 may send a request 226 to the MIDP server system 202 to transmit the descriptor 210 for the MIDlet update 208 to the MID 222. The request 226 may be included as part of a general request to transmit multiple descriptors to the MID 222. For example, in some embodiments the application manager 224 may periodically request that the MIDP server system 202 transmit to the MID 222 any new descriptors that have become available.

In response to the request 226, a request handler 228 on the MIDP server system 202 transmits the descriptor 210 to the MID 222. The application manager 224 provides information 230 from the descriptor 210 to the user of the MID 222 via a user interface 232. This has the effect of notifying the user that the MIDlet update 208 is available to be downloaded.

If the user decides to download the update that corresponds to the descriptor 210, the user submits a request 234 via the user interface 232 to download the MIDlet update 208. The user's request 234 is received by the application manager 224.

In response to the user's request 234, the application manager 224 sends a request 236 to the MIDP server system 202 to transmit the MIDlet update 208 to the MID 222. The request handler 228 on the MIDP server system 202 fulfills the request 236 and transmits the MIDlet update 208 to the MID 222.

When the MD 222 receives the MIDlet update 208, the application manager 224 invokes an installer 238. The installer 238 updates the MIDlet 240 by installing the files 204 from the MIDlet update 208 in the existing MIDlet 240. For example, the installer 238 may replace one or more files in the existing MIDlet 240 with replacement file(s) 104a. Alternatively, or in addition, the installer 238 may create one or more new files 104b in the existing MIDlet 240.

When the update 208 has been installed, the application manager 224 updates a version property 256 in a descriptor 250 for the MIDlet 240 to indicate that the update has been installed. In some embodiments, this involves setting the version property 256 equal to the value of the version property 118 in the update's descriptor 210.

In some situations, the system 200 shown in FIG. 2 may provide some advantages relative to known J2ME systems. As indicated above, in known J2ME systems a developer may update a MIDlet by creating a new version of the MIDlet that includes the desired update(s). However, there is no mechanism for separating the files of the MIDlet that implement the update(s) from the other files of the MIDlet. Thus, to obtain the update(s) for the MIDlet on the MID, the new version of the MIDlet is downloaded in its entirety, possibly including some files that have previously been downloaded to and installed on the MID. This approach may be somewhat inefficient, because some files of the MIDlet may be downloaded and installed multiple times.

In contrast, in the system 200 shown in FIG. 2, a MIDlet update 208 is provided. The MIDlet update 208 is separate from the existing MIDlet 240, and is not a complete replacement of the MIDlet 240. In other words, the MIDlet update 208 does not include at least some of the files that are already included within the existing MIDlet 240 and that do not need to be replaced. To update an existing MIDlet 240, the user is able to download the MIDlet update 208 without downloading an additional copy of the existing MIDlet 240. Thus, the user does not have to download files that have previously been downloaded to and installed on the MID 222. Accordingly, where a MIDlet 240 has already been downloaded to and installed on the MID 222, the system 200 shown in FIG. 2 may allow the MIDlet 240 to be updated more efficiently than in known J2ME systems.

Figure 3:
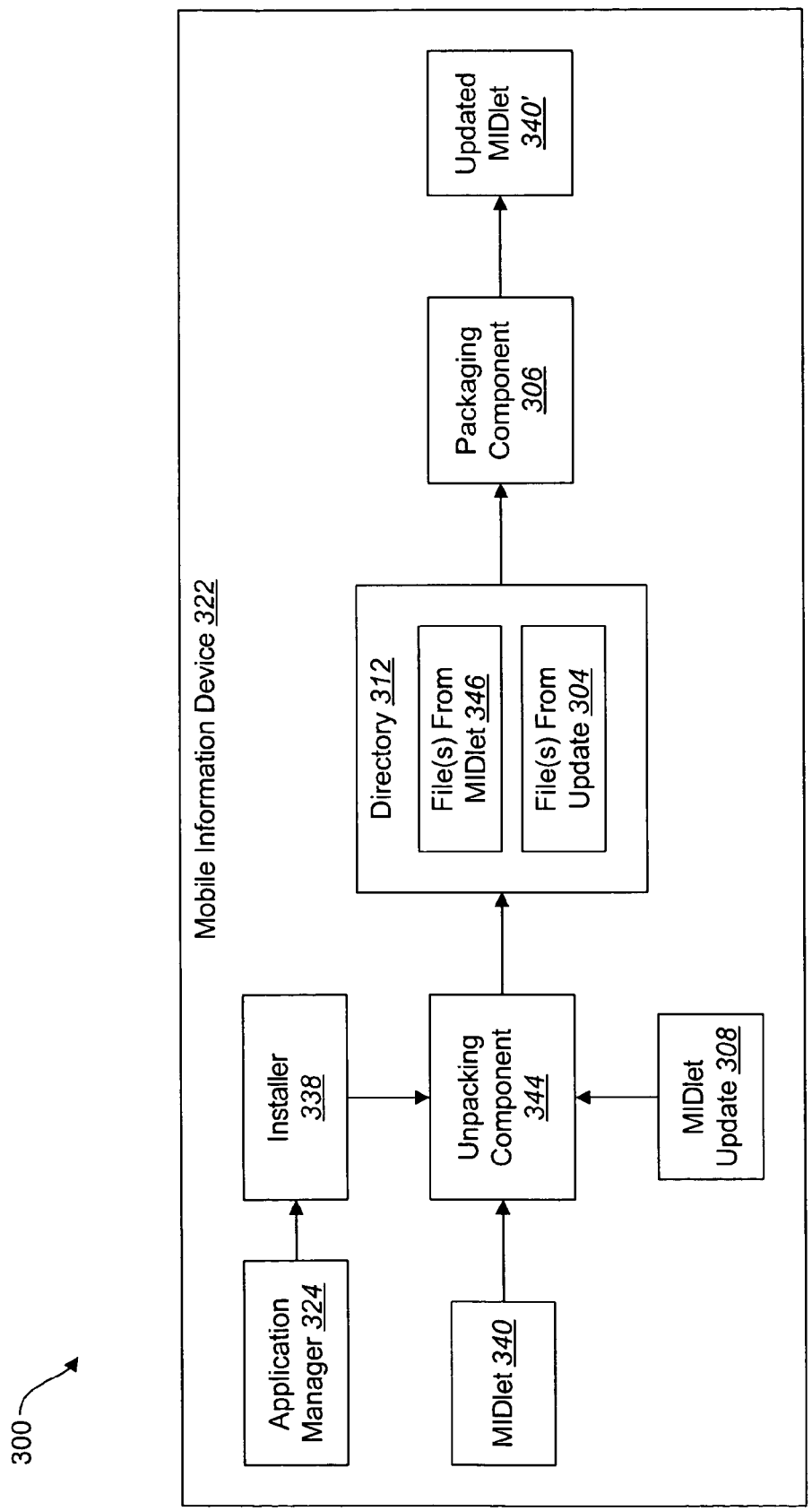
FIG. 3 illustrates various components in an MID that may be used to install a MIDlet update.

The discussion provided above in connection with FIG. 2 illustrates how an MID may discover, download, and install a MIDlet update from an MIDP server system. In some embodiments, the process of installing an update for a MIDlet may be accomplished by unpacking the MIDlet into a particular directory, and then subsequently unpacking the MIDlet update into the same directory. FIG. 3 illustrates various components that may be used to implement this functionality in some embodiments.

The system 300 shown in FIG. 3 includes an MID 322. The MID 322 has received an update 308 for an existing MIDlet 340. The files for the MIDlet update 308 are contained within a compressed file. The files for the MIDlet 340 are contained within a separate compressed file. In some embodiments, the files for the MIDlet update 308 may be enclosed within a Java® Archive (JAR) file, and the files for the MIDlet 340 may be enclosed within a separate JAR file.

To install the update 308, an application manager 324 calls an installer 338. The installer 338 calls an unpacking component 344, which unpacks the MIDlet 340. More specifically, the unpacking component 344 decompresses the file(s) 346 of the MIDlet 340 and writes them to a particular directory 312, which may be referred to as the base directory 312. In doing so, the unpacking component 344 reproduces the directory structure of the MIDlet 340.

After the MIDlet 340 has been unpacked, the unpacking component 344 then unpacks the MIDlet update 308 to the same directory 312. More specifically, the unpacking component 344 decompresses the file(s) 304 of the MIDlet update 308 and writes them to the same directory 312 as the files 346 of the original MIDlet 340. The unpacking component 344 reproduces the directory structure of the MIDlet update 308.

In the illustrated embodiment, the directory structure of the MIDlet update 308 matches the directory structure of the MIDlet 340. In other words, the MIDlet 340 and the MIDlet update 308 include the same base directory 312, and may include some or all of the same sub-directories. Thus, if a file 304 from the MIDlet update 308 has the same location relative to the base directory 312 as a file 346 from the MIDlet 340, the step of unpacking the MIDlet update 308 results in the file 304 from the MIDlet update 308 replacing the file 346 from the MIDlet 340 in the directory 312. Conversely, if there is not a file in the MIDlet 340 that has the same location relative to the base directory 312 as a file 304 from the MIDlet update 308, the step of unpacking the MIDlet update 308 results in the file 304 from the MIDlet update 308 being created in the directory 312.

Once the MIDlet update 308 has been unpacked into the directory 312, a packaging component 306 repackages all of the files 346, 304 in the directory 312. This has the effect of creating an updated MIDlet 340'. The updated MIDlet 340' includes the files 304 from the MIDlet update 308. As indicated above, these files 304 may provide functionality that was not present in the previous version of the MIDlet 340. Alternatively, or in addition, these files 304 may correct errors that have been found in the previous version of the MIDlet 340. The updated MIDlet 340' may also include at least some of the files 346 from the previous version of the MIDlet 340.

Figure 4:
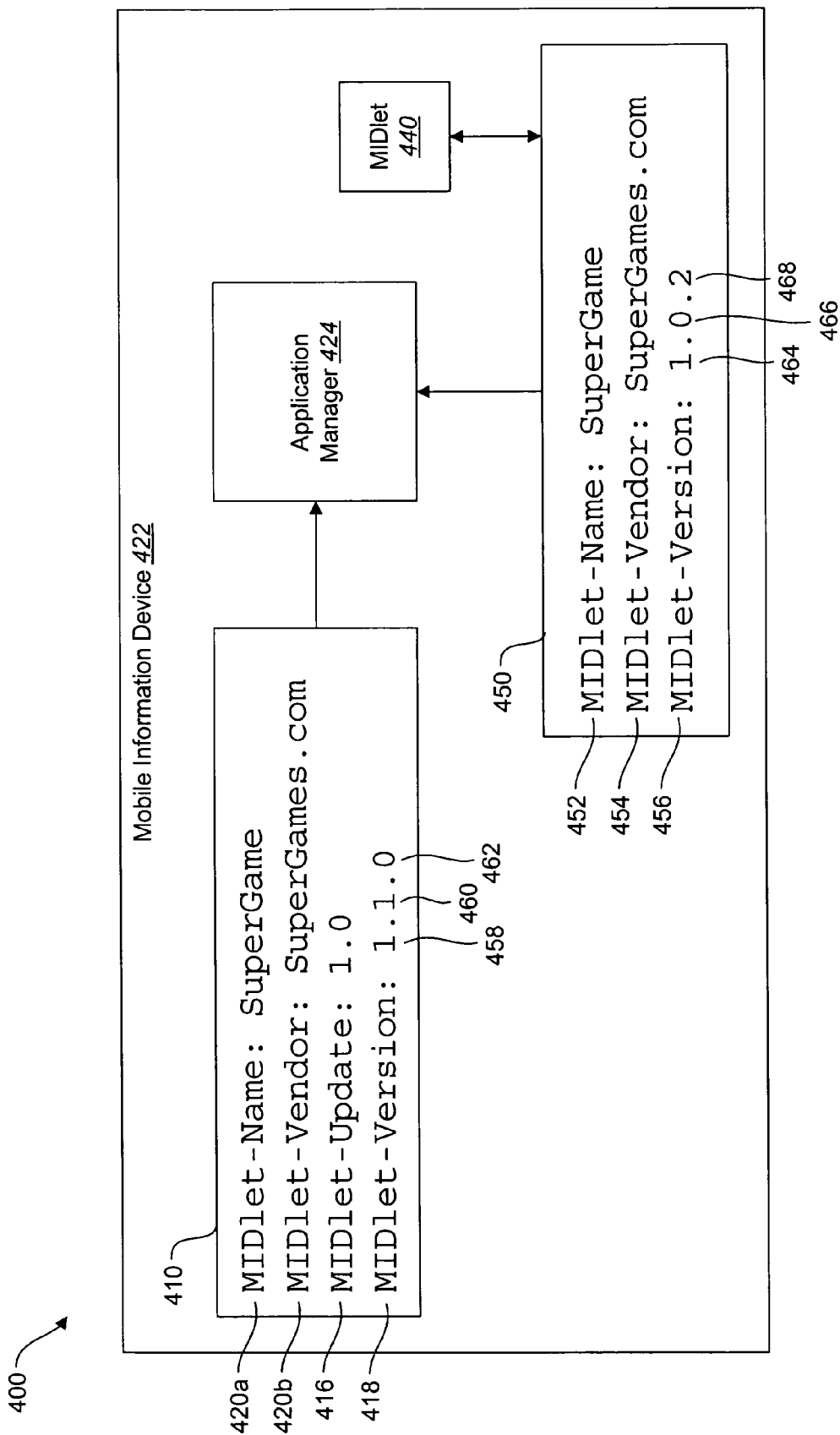
FIG. 4 illustrates various components in an MID that may be used to determine whether a descriptor identifies an update to a MIDlet.

The discussion provided above in connection with FIG. 3 illustrates an exemplary way that a MIDlet update may be installed on an MID. As indicated above, before a MIDlet update is installed on (or even downloaded to) an MID, a descriptor for the MIDlet update may be downloaded to the MID. When the MID initially receives the descriptor, the MID may not know that the descriptor identifies an update to an existing MIDlet, as opposed to a new MIDlet. Thus, when the MID receives a descriptor from an MIDP server system, the MID may initially determine whether the descriptor identifies an update to a MIDlet that is already installed on the MID, or whether the descriptor identifies a new MIDlet. FIG. 4 illustrates various components that may be used to implement this functionality in some embodiments.

The system 400 shown in FIG. 4 includes an MID 422. The MID 422 has received a descriptor 410 from an MIDP server system (not shown in FIG. 4). The descriptor 410 includes an update property 416. As indicated above, the update property 416 indicates that the descriptor 410 identifies an update to an existing MIDlet, as opposed to a new MIDlet. Thus, in the illustrated embodiment, an application manager 424 on the MID 422 may determine that the descriptor 410 identifies an update to an existing MIDlet by determining that the descriptor includes the update property 416.

There may be many MIDlets already installed on the MID 422. Thus, once the application manager 424 determines that the descriptor 410 identifies an update to a MIDlet, the application manager 424 may also identify the specific MIDlet that the update corresponds to. In other words, out of the many MIDlets that may be installed on the MD 422, the application manager 424 may identify a particular MIDlet for which the update is intended. In the illustrated embodiment, this may be accomplished by searching for a descriptor on the MID 422 that includes one or more properties that match corresponding properties in the update's descriptor 410.

More specifically, the descriptor 410 received from the MIDP server system includes a name property 420*a* and a vendor property 420*b*. As indicated above, the name property 420*a* and the vendor property 420*b* are standard properties that are presently defined in the MIDP specification. The descriptor 450 for the MIDlet 440 that the update corresponds to may also be stored on the MID 422. This descriptor 450 may also include a name property 452 and a vendor property 454.

To assist the application manager 424 in identifying the specific MIDlet that the update corresponds to, the value of the name property 420*a* in the update's descriptor 410 may be equal to the value of the name property 452 in the MIDlet's descriptor 450. Similarly, the value of the vendor property 420*b* in the update's descriptor 410 may be equal to the value of the vendor property 454 in the MIDlet's descriptor 450. Thus, to identify the specific MIDlet that the update corresponds to, the application manager 424 may search the descriptors that are stored on the MID 422 until a descriptor 450 is found with a name property 452 and a vendor property 454 that match the name property 420*a* and vendor property 420*b* in the update's descriptor 410.

Once the application manager 424 identifies the specific MIDlet 440 for which the update is intended, the application manager 424 may then determine whether the update is valid with respect to MIDlet 440. For example, an update may not be valid if it is intended for a version of the MIDlet 440 that is different than the version that is installed on the MID 422. In some embodiments, determining whether the update is valid may be accomplished by determining whether a version property 418 in the update's descriptor 410 refers to a later version of the MIDlet 440 than a version property 456 in the MIDlet's descriptor 450.

More specifically, in the illustrated embodiment, the version property 418 in the update's descriptor 410 includes a major field 458, a minor field 460, and a micro field 462. Similarly, the version property 456 in the MIDlet's descriptor 450 includes a major field 464, a minor field 466, and a micro field 468. The update is valid with respect to the MIDlet 440 if any of the following three conditions are true: (1) the major field 458 of the version property 418 in the update's descriptor 410 exceeds the major field 464 of the version property 456 in the MIDlet's descriptor 450; (2) the major field 458 of the version property 418 in the update's descriptor 410 does not exceed the major field 464 of the version property 456 in the MIDlet's descriptor 450, but the minor field 460 of the version property 418 in the update's descriptor 410 exceeds the minor field 466 of the version property 456 in the MIDlet's descriptor 450; or (3) the major field 458 of the version property 418 in the update's descriptor 410 does not exceed the major field 464 of the version property 456 in the MIDlet's descriptor 450 and the minor field 460 of the version property 418 in the update's descriptor 410 does not exceed the minor field 466 of the version property 456 in the MIDlet's descriptor 450, but the micro field 462 of the version property 418 in the update's descriptor 410 exceeds the micro field 468 of the version property 456 in the MIDlet's descriptor 450.

Figure 5:
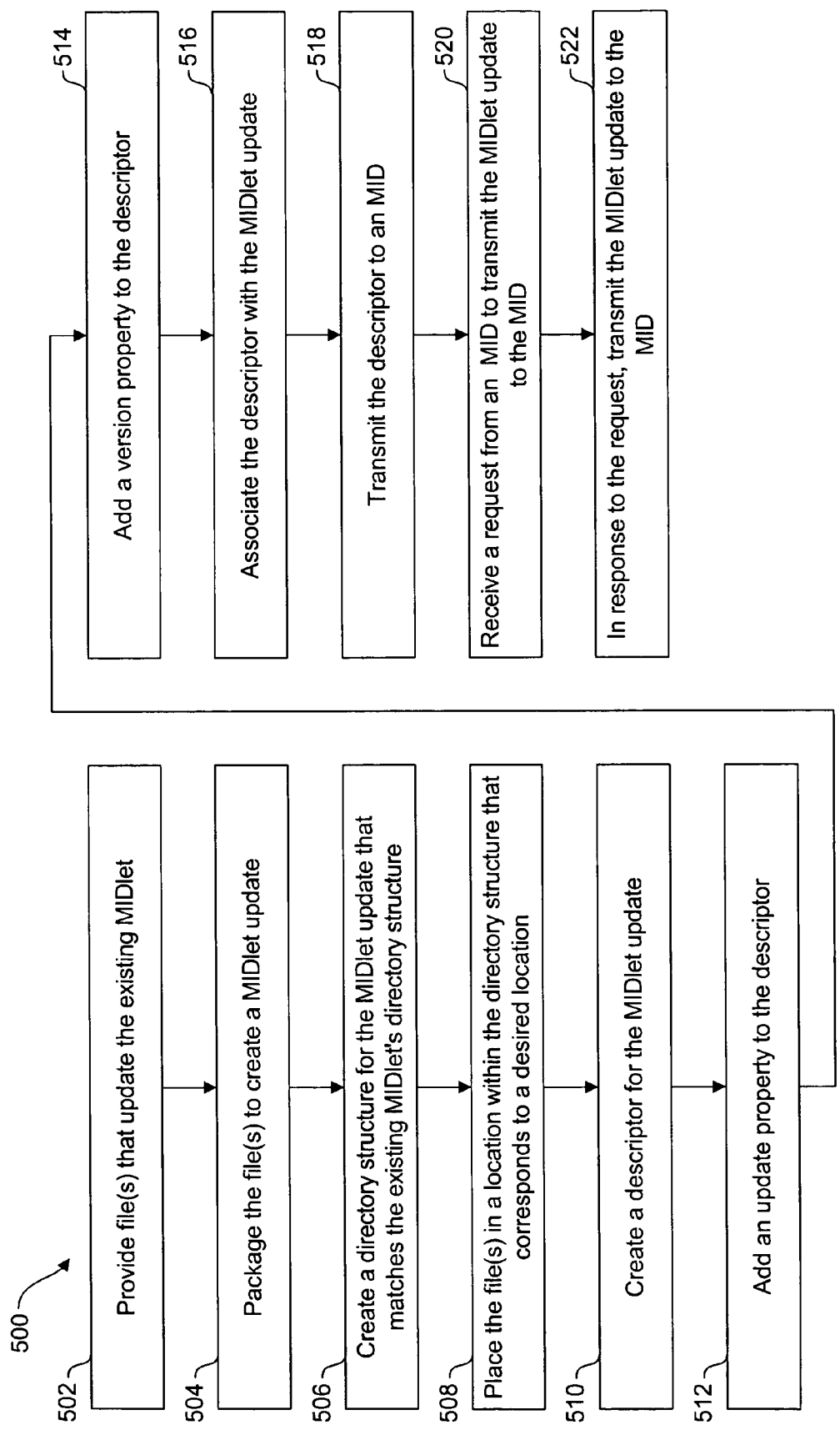
FIG. 5 illustrates an embodiment of a method for providing an update to an existing MIDlet.

FIG. 5 illustrates an embodiment of a method 500 for providing an update to an existing MIDlet 240. The method 500 may be performed by components in an MIDP server system 102.

One or more files 104 that update an existing MIDlet 240 are provided 502. The files 104 may provide additional functionality for the MIDlet 240, correct errors that have been found in the MIDlet 240, etc. The files 104 may include Java® class files, content files (e.g., images), etc.

A packaging component 106 packages 504 the files 104, thereby creating a MIDlet update 108. As part of the process of packaging 504 the files 104, the packaging component 106 creates 506 a directory structure 112 for the MIDlet update 108 that matches the directory structure of the existing MIDlet 240. For example, a base directory may be provided that matches the base directory of the existing MIDlet 240. In addition, sub-directories may be created within the MIDlet update 108 that match the sub-directories within the existing MIDlet 240.

The packaging component 106 places 508 the files 104 in a location within the directory structure of the MIDlet update 108 that corresponds to a desired location within the existing MIDlet 240. For example, if a file 104 is supposed to be installed in the base directory of the existing MIDlet, then the file 104 may be placed in the base directory of the MIDlet update 108. Similarly, if a file 104 is supposed to be installed in a particular sub-directory of the existing MIDlet, then the file 104 may be placed in that sub-directory of the MIDlet update 108.

The packaging component 106 creates 510 a descriptor 110 for the MIDlet update 108. The descriptor 110 is a file that is associated with, but separate from, the MIDlet update 108. The descriptor 110 includes information about the MIDlet update 108.

The packaging component 106 adds 512 an update property 116 to the descriptor 110. The update property 116 indicates that the descriptor 110 identifies an update to an existing MIDlet, as opposed to a new MIDlet. The packaging component 106 also adds 514 a version property 118 to the descriptor 110. The version property 118 identifies the version number of the existing MIDlet 240 that will be created once the files 104 from the MIDlet update 108 are installed in the MIDlet 240. The descriptor 110 is associated 516 with the MIDlet update 108.

A request handler 228 on the MIDP server system 102 may receive a request from an MID 222 to transmit the descriptor 110 to the MID 222. The request handler 228 may fulfill this request by transmitting 518 the descriptor 110 to the MID 222. The request handler 228 may, at some point, receive 520 a request from the MID 222 to transmit the MIDlet update 108 to the MID 222. The request handler 228 may fulfill this request by transmitting 522 the MIDlet update 108 to the MID 222.

Figure 6:
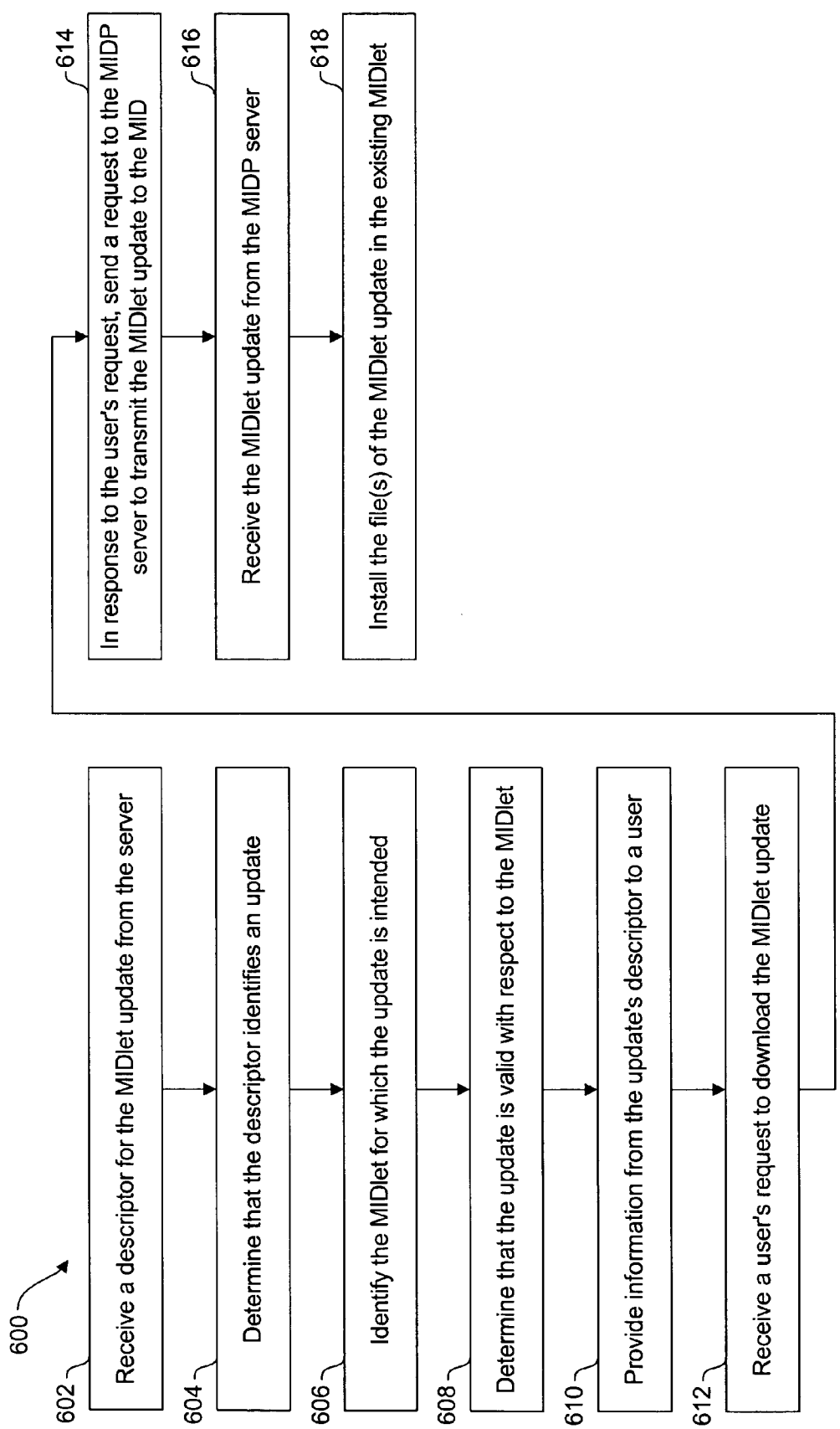
FIG. 6 illustrates an embodiment of a method for obtaining an update to an existing MIDlet.

FIG. 6 illustrates an embodiment of a method 600 for obtaining an update to an existing MIDlet 240. The method 600 may be performed by components in an MID 222.

An application manager 324 receives 602 a descriptor 210 for a MIDlet update 208 from an MIDP server system 202. The application manager 324 determines 604 that the descriptor 210 identifies an update to a MIDlet 240 that is already installed on the MID 222 (as opposed to identifying a standalone MIDlet). The application manager 324 also identifies 606 the MIDlet for which the update is intended, and determines 608 that the update is valid with respect to the MIDlet.

The application manager 224 provides 610 information 230 from the descriptor 210 to the user of the MID 222. This has the effect of notifying the user that the MIDlet update 208 is available to be downloaded. If the user decides to download the update that corresponds to the descriptor 210, the application manager receives 612 the user's request to download the MIDlet update 208. In response to the user's request, the application manager 224 sends 614 a request to the MIDP server system 202 to transmit the MIDlet update 208 to the MID 222. When a request handler 228 on the MIDP server system 202 fulfills the request, the application manager 224 receives 616 the MIDlet update 208 from the MIDP server system 202.

When the MID 222 receives the MIDlet update 208, the application manager 224 calls an installer 238, which installs 618 the file(s) of the MIDlet update 208 in the existing MIDlet 210. For example, the installer 238 may replace one or more files in the existing MIDlet 240 with replacement file(s) 104a. Alternatively, or in addition, the installer 238 may create one or more new files 104b in the existing MIDlet 240.

Figure 7:
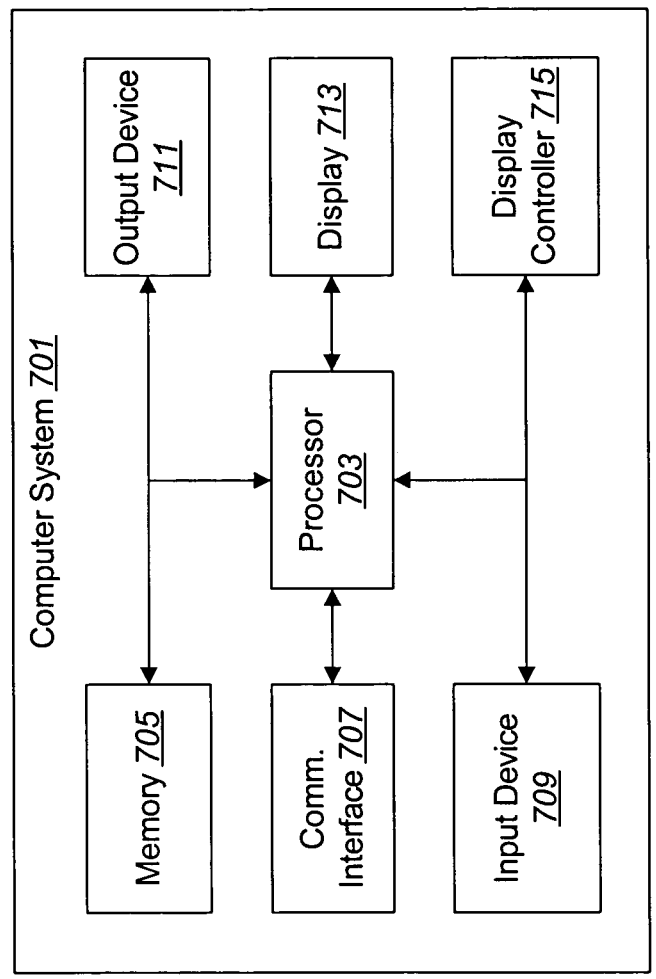
FIG. 7 is a block diagram illustrating the major hardware components typically utilized in a computer system.

FIG. 7 is a block diagram illustrating the major hardware components typically utilized in a computer system 701. The illustrated components may be located within the same physical structure or in separate housings or structures.

The computer system 701 includes a processor 703 and memory 705. The processor 703 controls the operation of the computer system 701 and may be embodied as a microprocessor, a microcontroller, a digital signal processor (DSP) or other device known in the art. The processor 703 typically performs logical and arithmetic operations based on program instructions stored within the memory 705.

As used herein, the term memory 705 is broadly defined as any electronic component capable of storing electronic information, and may be embodied as read only memory (ROM), random access memory (RAM), magnetic disk storage media, optical storage media, flash memory devices in RAM, on-board memory included with the processor 703, EPROM memory, EEPROM memory, registers, etc. The memory 705 typically stores program instructions and other types of data. The program instructions may be executed by the processor 703 to implement some or all of the methods disclosed herein.

The computer system 701 typically also includes one or more communication interfaces 707 for communicating with other electronic devices. The communication interfaces 707 may be based on wired communication technology, wireless communication technology, or both. Examples of different types of communication interfaces 707 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 701 typically also includes one or more input devices 709 and one or more output devices 711. Examples of different kinds of input devices 709 include a keyboard, mouse, microphone, remote control device, button, joystick, trackball, touchpad, lightpen, etc. Examples of different kinds of output devices 711 include a speaker, printer, etc. One specific type of output device which is typically included in a computer system is a display device 713. Display devices 713 used with embodiments disclosed herein may utilize any suitable image projection technology, such as a cathode ray tube (CRT), liquid crystal display (LCD), light-emitting diode (LED), gas plasma, electroluminescence, or the like. A display controller 715 may also be provided, for converting data stored in the memory 705 into text, graphics, and/or moving images (as appropriate) shown on the display device 713.

Of course, FIG. 7 illustrates only one possible configuration of a computer system 701. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise congfiguration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a server system that hosts one or more MIDlet suites and one or more MIDlet descriptors for download, a method for providing an update to an existing MIDlet, comprising:
   providing one or more files that update the existing MIDlet;
   packaging the one or more files to create a MIDlet update, wherein the MIDlet update does not comprise a complete replacement of the existing MIDlet, wherein each file in the MIDlet update is either a replacement file or a new file, and wherein each replacement file is a newer version of a file that already exists in the existing MIDlet;
   creating a descriptor for the MIDlet update;
   adding an update property to the descriptor, wherein the update property identifies the MIDlet update as an update to the existing MIDlet;
   associating the descriptor with the MIDlet update; and
   transmitting the MIDlet update to the mobile information device without retransmitting files in the existing MIDlet that are not part of the MIDlet update.

2. The method of claim 1, further comprising:
   creating a directory structure for the MIDlet update that matches the existing MIDlet's directory structure; and
   placing each of the one or more files in a location within the directory structure that corresponds to a desired location within the existing MIDlet's directory structure.

3. The method of claim 1, further comprising adding a version property to the descriptor.

4. The method of claim 3, wherein the version property comprises a major field, a minor field, and a micro field.

5. The method of claim 1, further comprising transmitting the descriptor to a mobile information device.

6. The method of claim 1, further comprising:
   receiving a request from a mobile information device to transmit the MIDlet update to the mobile information device, wherein the MIDlet update is transmitted to the mobile information device in response to the request.

7. In a mobile information device, a method for obtaining an update to an existing MIDlet, comprising:
   receiving a user's request to download a MIDlet update, wherein the MIDlet update comprises one or more files that update the existing MIDlet, wherein the MIDlet update does not comprise a complete replacement of the existing MIDlet, wherein each file in the MIDlet update is either a replacement file or a new file, and wherein each replacement file is a newer version of a file that already exists in the existing MIDlet;
   in response to the user's request, sending a request to a server to transmit the MIDlet update to the mobile information device;
   receiving the MIDlet update from the server without receiving a retransmission of files in the existing MIDlet that are not part of the MIDlet update; and
   installing the one or more files of the MIDlet update in the existing MIDlet.

8. The method of claim 7, wherein the MIDlet update comprises a directory structure that matches the existing MIDlet's directory structure.

9. The method of claim 7, wherein installing the one or more files of the MIDlet update in the existing MIDlet comprises:
    unpacking the existing MIDlet into a directory;
    subsequently unpacking the MIDlet update into the directory; and
    repackaging files within the directory to create an updated version of the existing MIDlet.

10. The method of claim 7, wherein installing the one or more files of the MIDlet update in the existing MIDlet comprises at least one of:
    replacing a file in the existing MIDlet with a replacement file; and
    creating a new file in the existing MIDlet.

11. The method of claim 7, further comprising:
    receiving a descriptor from the server; and
    determining that the descriptor identifies an update.

12. The method of claim 11, wherein determining that the descriptor identifies an update comprises determining that the descriptor comprises an update property.

13. The method of claim 11, further comprising identifying a MIDlet for which the update is intended.

14. The method of claim 13, wherein identifying the MIDlet for which the update is intended comprises searching for another descriptor on the mobile information device that includes one or more properties that match corresponding properties in the descriptor.

15. The method of claim 13, further comprising determining that the update is valid with respect to the MIDlet.

16. The method of claim 15, wherein determining that the update is valid comprises determining that a first version property in the descriptor refers to a later version of the MIDlet than a second version property in the MIDlet's descriptor.

17. The method of claim 11, further comprising providing information from the descriptor to a user.

18. A computer system that is configured to obtain an update to an existing MIDlet, the computer system comprising:
    a processor;
    memory in electronic communication with the processor;
    instructions stored in the memory, the instructions being executable to:
        receive a user's request to download a MIDlet update, wherein the MIDlet update comprises one or more files that update the existing MIDlet, wherein the MIDlet update does not comprise a complete replacement of the existing MIDlet, wherein each file in the MIDlet update is either a replacement file or a new file, and wherein each replacement file is a newer version of a file that already exists in the existing MIDlet;
        in response to the user's request, send a request to a server to transmit the MIDlet update to the mobile information device;
        receive the MIDlet update from the server without receiving a retransmission of files in the existing MIDlet that are not part of the MIDlet update; and
        install the one or more files of the MIDlet update in the existing MIDlet.

19. A computer-readable medium for obtaining an update to an existing MIDlet, the computer-readable medium comprising executable instructions for:
    receiving a user's request to download a MIDlet update, wherein the MIDlet update comprises one or more files that update the existing MIDlet, wherein the MIDlet update does not comprise a complete replacement of the existing MIDlet, wherein each file in the MIDlet update is either a replacement file or a new file, and wherein each replacement file is a newer version of a file that already exists in the existing MIDlet;
    in response to the user's request, sending a request to a server to transmit the MIDlet update to the mobile information device;
    receiving the MIDlet update from the server without receiving a retransmission of files in the existing MIDlet that are not part of the MIDlet update; and
    installing the one or more files of the MIDlet update in the existing MIDlet.

* * * * *